United States Patent [19]

Coulombe

[11] Patent Number: 4,702,55!

[45] Date of Patent: Oct. 27, 1987

[54] METHOD AND APPARATUS FOR HANDLING AND STORING CABLED SPLICED ENDS OF FIBER OPTICS

[75] Inventor: David J. Coulombe, Skokie, Ill.

[73] Assignee: Reliance Comm/Tec Corporation, Chicago, Ill.

[21] Appl. No.: 659,580

[22] Filed: Oct. 11, 1984

[51] Int. Cl.$^4$ ............................ G02B 6/36; G02B 7/26
[52] U.S. Cl. ................................ 350/96.20; 350/96.21; 350/96.22
[58] Field of Search ................. 350/96.20, 96.22, 96.21

[56] References Cited

U.S. PATENT DOCUMENTS

| | | | |
|---|---|---|---|
| 3,846,010 | 11/1974 | Love et al. | 350/96 WG |
| 3,912,574 | 10/1975 | Cherin et al. | 350/96.21 |
| 4,171,867 | 10/1979 | Cocito | 350/96.21 |
| 4,183,616 | 1/1980 | Benoit et al. | 350/96.20 |
| 4,257,673 | 3/1981 | Matthijsse | 350/96.19 |
| 4,319,951 | 3/1982 | Korbelak et al. | 350/96.21 |
| 4,359,262 | 11/1982 | Dolan | 350/96.20 |
| 4,428,645 | 1/1984 | Korbelak et al. | 350/96.20 |
| 4,441,786 | 4/1984 | Hulin et al. | 350/96.21 |

Primary Examiner—William L. Sikes
Assistant Examiner—Robert E. Wise
Attorney, Agent, or Firm—Michael M. Rickin

[57] ABSTRACT

Apparatus and method for storing the spliced end sections of optical fibers comprises a tray having a first and second series of channels each for receiving an optical fiber, the first series being spaced from the second series by a gap, a splice block releasably mounted in the gap, the splice block also having a series of channels that substantially span the gap whereby the respective channels of the first series are connected to the corresponding channels of the second series by the channels in the splice block. A tray is used for each group of fibers (one group from each cable) spliced together respectively to connect the cables together. The optical fibers from a first cable are spliced to the corresponding optical fibers in a second cable, the splices being mounted on the splice block. The tray constitutes a means for storing the buffer tubing that is wound up on the tray. A receptacle is provided with a plurality of tray mounting cavities for storage and individual retrieval of each of the trays.

18 Claims, 6 Drawing Figures

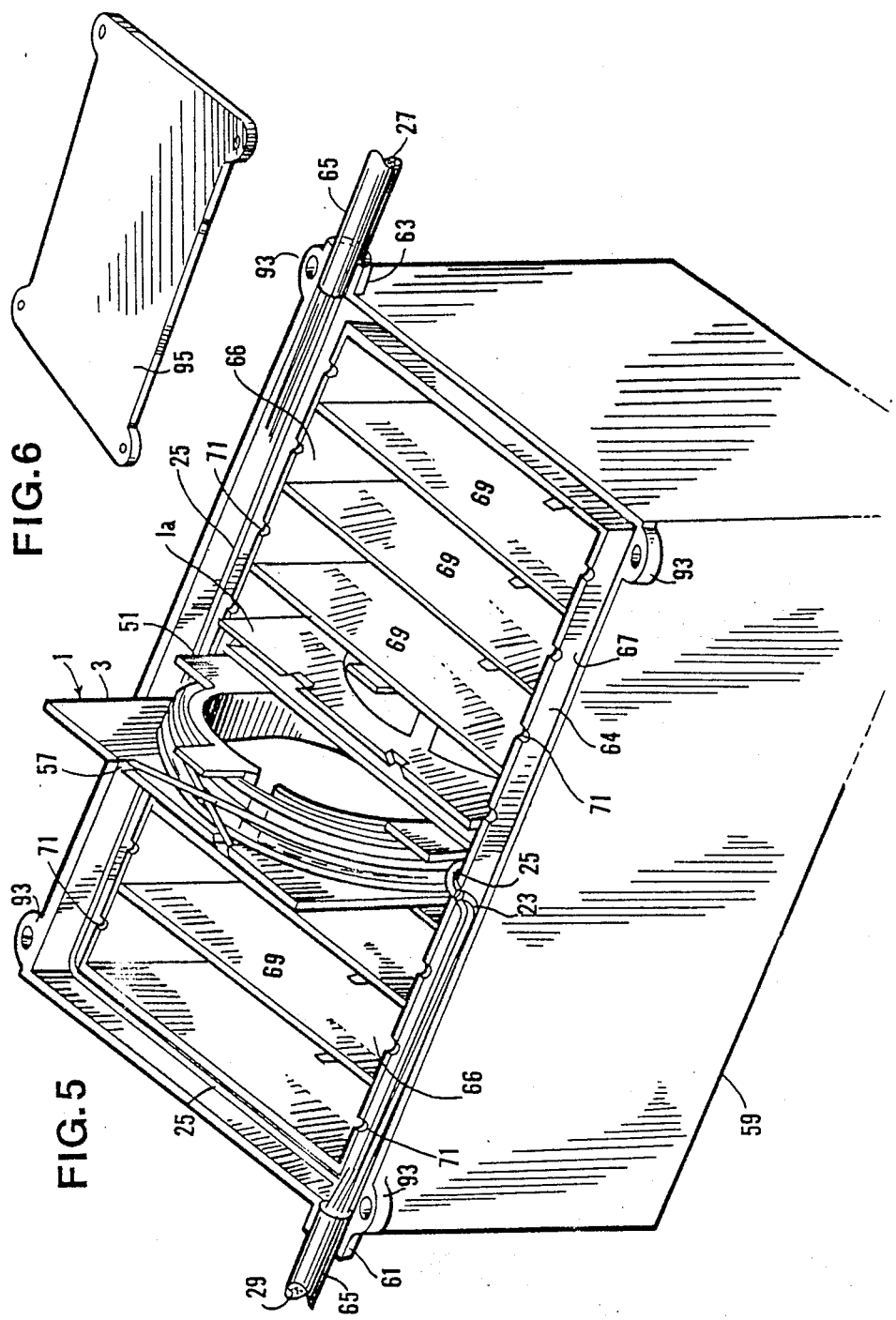

METHOD AND APPARATUS FOR HANDLING AND STORING CABLED SPLICED ENDS OF FIBER OPTICS

BACKGROUND OF THE INVENTION

This invention relates generally to the handling and storing of fiber optic communications cables, and more particularly an improved method and apparatus whereby the spliced optical fibers of the cable are conveniently stored, protected and organized.

The cable with which the present invention is concerned consists of a number of plastic buffer tubes which typically may be from five to ten in number. Each buffer tube contains from one to twelve optical fibers. In the cable proper the buffer tubes are stranded over a central strength member of steel wire or the like and covered by an outer jacket or sheath of polyethylene or polyvinyl chloride.

The optical fibers themselves are approximately $125 \times 10^{-6}$ meters (0.005 inches) in diameter and contain a protective plastic coating which increases the diameter to $250 \times 10^{-6}$ meters (0.010 inches). Prior to splicing one optical fiber with another the plastic coating is first removed to expose the glass. This may be done by immersing the fiber in a methylene chloride solution or by other conventional means. The exposed fibers are then trimmed with a suitable hand tool to insure that the ends of the fibers have a clean sharp cut. The two fibers to be spliced are placed in a fusion splicer and accurately aligned by a microscope following which an electric arc is discharged at the ends of the fibers to melt the glass and fuse the two fibers together. Prior to the splicing operation a protective sleeve is slid over one of the fibers and shifted to a position out of the way of the splice region, and after the splice is made the protective sleeve is slid over the splice to protect the same.

A typical buffer tube encases from six to twelve optical fibers. A length of each fiber of the order of about six inches projects outwardly from the buffer tube so as to be exposed for splicing and for mounting on a splice tray. The length of buffer tube extending from the splice tray to the sheath of the main cable may be of the order of fifteen to twenty feet to enable the splicing to be carried out at a remote location. This length must, however, be stored, organized, and protected. Moreover, the storage arrangement must be such that individual fibers can be addressed in the future if desired.

Various arrangements have been provided for organizing the exposed lengths of buffer tubing and the individual fibers. In general the individual fibers are organized by putting the splices into the protective sleeves, as aforesaid, and mounting the individual splices on a splice block which forms a permanent part of a tray. The tray keeps the fibers from being tangled and the tray also holds the fibers in a manner to insure that the minimum bend radius of the glass fiber is not exceeded. The buffer tubing may be wrapped about the tray and/or stored in a compartment in a splice box.

On large fiber cables, more than one tray is employed, for example one tray for each group of fibers in a buffer tube. A standard procedure of organizing the various trays is to place them in stacked relationship in a receptacle, which is thereafter closed and placed underground. To facilitate recovery of the stacked trays it is sometimes desired to place the receptacle in a closure called a "hand hole". This is a large box which is used to store the receptacle underground without having to surround completely the receptacle with dirt. The hand hole is covered with about six inches of dirt, and the cable is buried about thirty inches deep. To get at the cable only six inches of dirt need be removed to obtain access to the lid of the hand hole.

In the foregoing arrangements the embodiment of the splice block as a permanent part of the tray inhibits the use of splice blocks of various sizes or configurations. For different splices a different splice tray must be used. This is in contrast to a convenient and smaller removable splice block which is used in the present invention. Moreover, when the stacked tray construction is used, it is frequently necessary to disturb one or more of the trays when access is sought to one or more of the other trays.

OBJECTS AND SUMMARY OF THE INVENTION

One object of this invention is to provide a method and apparatus of the type stated in which the splice trays are not stacked and bolted together in the receptacle, but instead are placed individually in cavities or chambers in a receptacle, whereby each tray is individually accessible and retrievable without disturbing the other trays.

It is a further object of this invention to provide a method and apparatus of the type stated in which each tray constitutes on its backside a storage area for a substantial length of buffer tube. This feature also facilitates removal of an individual tray from the receptacle without disturbing the other trays, whereby the individual tray may be moved to a work station that may be some fifteen to twenty feet away from the receptacle.

A further object of this invention is to provide an apparatus and method of the type stated in which the splice block is removable from the tray to permit the use of various types of splice blocks, thereby accommodating different kinds of splices, and also making splicing easier in that only the splice block and not the entire tray need be taken to the fusion splicer.

When the cables are to be spliced, the sheath is stripped back to expose some twenty feet of buffer tube for each cable. In the example of the invention herein described, and without limitation, there are twelve fibers in each buffer tube and eight buffer tubes in each cable. Each buffer tube is routed to the appropriate recess or cavity in the receptacle and secured in place. The buffer tubes are then cut to the appropriate lengths, for instance about seventeen feet, and at the free end of each buffer tube a short length of about six inches of buffer tube is removed to expose lengths of optical fibers. The splice block, which is removably mounted in the tray, is removed from the tray. Splices are made by the fusion splicer and the splices are mounted in the splice block. Covers are placed over the splices and the covered splices are secured by adhesive to the splice block. The splice block is then snapped into the tray and the optical fiber leads from the splices are disposed in channels or grooves in the tray which partially extend over the length of exposed fiber. The ends of the buffer tubes are secured to the tray as by a strain relief clamp or the like following which the buffer tubes are trained over the tray so that they are disposed in a storage region thereon. The tray is then rotated in one direction to take up both lengths of buffer tubing until the requisite amount has been accummulated following which the tray may be deposited into a cavity in the receptacle.

In accordance with the foregoing features the invention comprises a method of handling and storing splice ends of optical fibers of first and second optical fiber cables in which the fibers in each cable are in a plurality of buffer tubes with each buffer tube encasing the plurality of optical fibers and each cable having a sheath encasing the buffer tubes, said method comprising providing for each of said first and second cables a length of buffer tube that ends beyond the end of the associated cable sheath, providing for each said buffer tube a length of each of the optical fibers in the tube that extends beyond the end of the associated buffer tube, splicing the end of each fiber with an end of a fiber projecting from the other buffer tube to form a plurality of optical fiber splices between the ends of the buffer tubes, mounting the splices on a splice block such that the splices are spaced from each other but are in juxtaposed relationship, securing said splices in place on said splice block in said spaced juxtaposed relationship, mounting said splice block with the splices thereon on a support member with the fibers being retained on the support member for disposition along predetermined paths, wrapping the buffer tubes over said support member a plurality of times to take up and store the length of buffer tube resulting from the portion of the buffer tube that projects from the end of its associated cable sheath, and retrievably storing the support member on an additional structure.

The invention further comprises apparatus for storing the spliced end sections of optical fibers comprising a tray having means for forming first and second series of channels each for receiving an optical fiber, the first series being spaced from the second series by a gap, a splice block releasably mounted in said gap, said splice block also having means forming a series of channels that substantially spans said gap whereby the respective channels in the first series are connected to the corresponding channels in the second series by the channels in the splice block, optical fibers from a first cable being spliced to corresponding optical fibers from a second cable, said splices being in said splice block channels, means for accumulating and storing on said tray fibers leading from the splices to the first and second cables, and a receptacle having a plurality of tray mounting means for mounting a plurality of trays for individual retrieval without disturbing the other trays.

BRIEF DESCRIPTION OF THE FIGURES

FIG. 5 is a perspective view of the receptacle and showing a splice tray mounted therein and the routing of the buffer tubes; and FIG. 6 is a perspective view of the cover for the receptacle.

DETAILED DESCRIPTION

Figure 1:
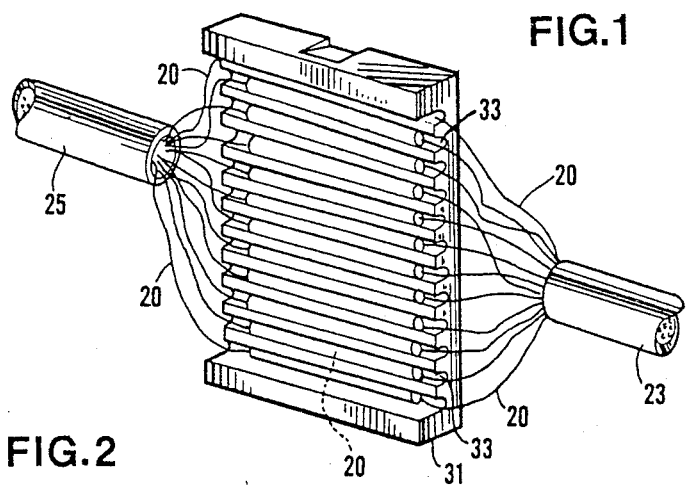
FIG. 1 is a perspective view of a splice block showing the splices applied thereto, and forming part of the present invention.

Referring now in more detail to the drawings there is shown a splice-support in the form of a splice tray 1 having a retangular base 3 upon which is formed a pair of opposed raised structures 5, 7. These raised structures define first and second series of opposed channels 9, 11. The raised structures are highest at their facing ends and gradually taper down to a minimum at their distal ends 13, 13. The channels 9, 11 are arcuate in configuration so as to define radii which are substantially greater than the minimum bending radius permitted for the optical fibers 20 for which the tray is to be used. In the form of the invention shown there are twelve channels in each series to accommodate the twelve fibers 20 in each buffer tube 23, 25, one from each of the first and second cables 27, 29 to be spliced together. Outwardly of the raised structures 5, 7 are arcuate walls 15, 17, 10 and 21 around which buffer tubes 23, 25 are wrapped.

Removably mounted between the raised structures 5, 7 is a splice block 31 having channels 33 which are in respective alignment with the channels 9, 11. The splice block is substantially as wide as is the gap between the raised sections 5, 7 so that the channels 33 in effect form continuations of the channels 9, 11. The splice block 31 is held assembled with the tray by resilient fingers 35, 37 which snap fit over the ends of the splice block 31.

Figure 4:
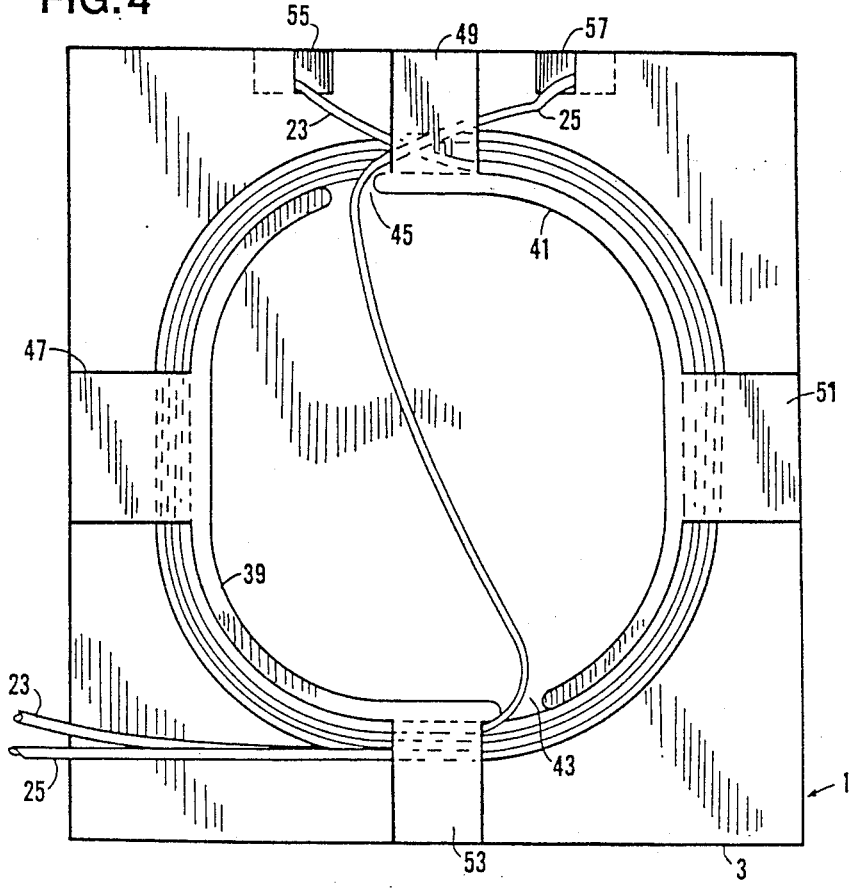
FIG. 4 is a rear elevational view of the splice tray.

On the backside of the tray (see FIG. 4) are opposed walls 39, 41 between which are gaps 43, 45. The back walls 39, 41 have arcuate portions as well as straight portions, the latter having rectangular flanges 47, 49, 51, 53 projecting therefrom, the flanges being spaced 90 degrees apart. The back walls 39, 41 and the flanges 47–53, together with the base 3 constitute a drum for winding and storage of buffer tubing, as will presently be more fully described. Adjacent to the flange 49, namely remote from the raised structures 5, 7 are slots 55, 57 which provide communication at the periphery of the base 3 to the backside of the tray or support 1.

A receptable of container 59 (see FIG. 5) forms a structure member upon which a plurality of the trays are disposed. More particularly the receptable 59 comprises a rectangular body having horizontal bosses or cable apertures 61, 63 at opposed corners thereof. These bosses receive the sheaths 65, 65 of the respective cables 27, 29 which are clamped or secured at the bosses 61, 63 in any convention manner.

The splice box or receptable 59 is a structure that has an outer rectilinear body and integral an inner rectilinear shell 64 both of which are open top. The inner shell 64 forms with the outer rectilinear body a storage passageway 67 that surrounds the inner shell 64. This storage passageway 67 provides space for accumulation and/or routing of the buffer tubing from the cables 27, 29. In the present example illustrated and described the receptable 59 is adapted to hold eight trays for the eight buffer tubes in each cable.

The inner shell 64 has a series of transverse partitions 69 which divide the interior of the shell 64 into the eight compartments or cavities 66. Furthermore, opposite ends of the compartments are formed with notches 71 which receive the buffer tubing 23, 25 as well as the buffer tubing for the other trays to be used with the receptable 59. As will be noted from FIG. 5 an empty tray 1a is shown disposed within one of the cavities 66 of the shell 64. There is also shown a tray with wound buffer tubing thereon and partially inserted within one of the cavities of the shell 64.

The receptacle 59 may be formed with a series of bosses 93 that are threaded for receiving bolts (not shown) by which a cover 95 (FIG. 6) may be removably secured to the open top of the receptacle 59.

In use the sheath 65 of the respective cables 27, 29 to be spliced are cut off so as to leave about twenty feet or so exposed for each buffer tube. This will allow sufficient length so that the tubing with the fibers therein may be carried to a nearby work station. The exposed buffer tubing may be cut to an appropriate length, for instance about seventeen feet, and the free ends of the buffer tubing may be stripped back to expose about six inches of each of the twelve optical fibers 20. The fibers are cleanly cleaved to provide clean cut ends whereupon protective tubing of glass or the like is slipped over the ends of one set of fibers and pushed out of the way so as not to interfere with the splicing operation. The splices of the fibers in the two buffer tubes 23, 25 are then made in the fusion splicer in the conventional manner whereupon the glass tubing is placed over the splices for protective purposes. The splices are then mounted in the splice block (previously removed from the tray 1) and cemented in place with an appropriate adhesive so that the fibers remain in spaced but juxtaposed relationship. The splice block 31 is then mounted in place under the fingers 35, 37 and the respective fibers are disposed within the respective channels 9, 11. The length of buffer tubing cut off is preferably such that the ends of the buffer tubing will be adjacent to the walls 19, 21 and the buffer tubes 23, 25 near their ends are preferably held in place by any suitable conventional strain relief devices generally depicted at 44 (see FIG. 4).

Figure 2:
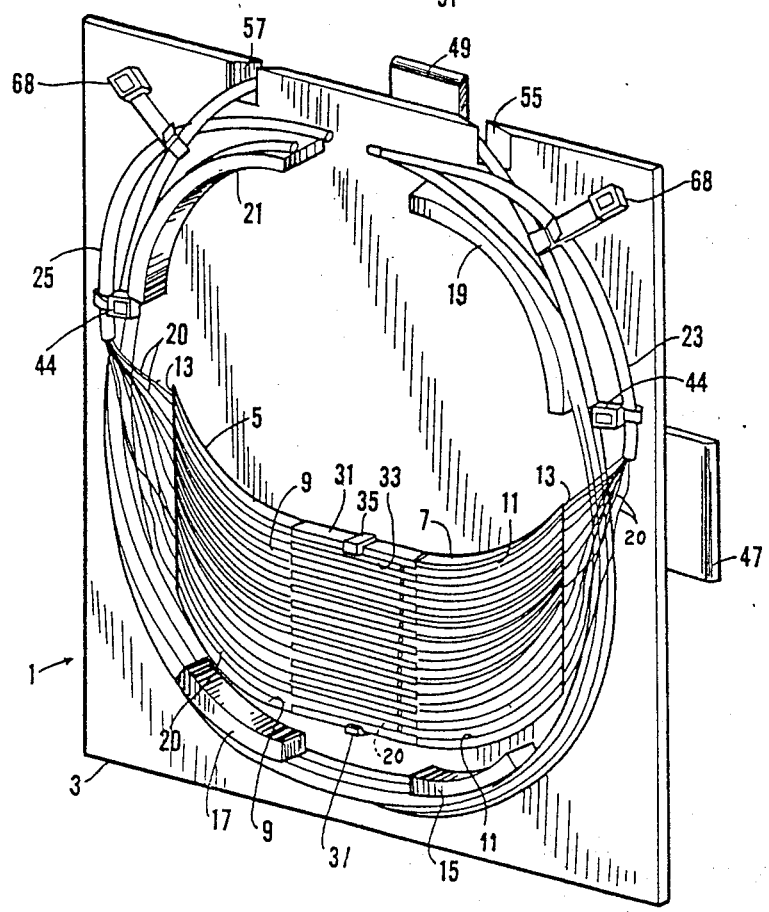
FIG. 2 is a perspective view of the splice tray with the splice block mounted therein.
Figure 3:
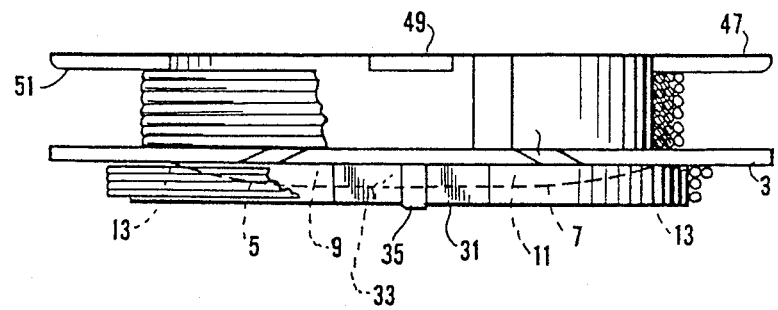
FIG. 3 is a top plan view of the splice tray.

One of the buffer tubes 23 is wrapped around the front face arcuate walls 15, 17, 19, 21 and then passes through the slot 55 and is wrapped around the back walls 39, 41 in the region between the base 3 and the flanges 47–53. The other buffer tube 25 is also wrapped around the front face arcuate walls 15, 17, 19, 21 but in the opposite direction. However, tube 25 passes through the slot 57 and through the back wall gaps 43, 45 (see FIG. 4) before being wrapped around the back walls 39, 41 so that it is prepared for winding onto the tray along with the tube 23 by rotation in one direction. Accordingly, upon rotation of the tray in one direction the excess or slack in both buffer tubes 23, 25 is taken up until finally the tray may be deposited in one of the cavities 66 of receptacle 59 leaving only a short length of buffer tubing running from the tray 1 to the associated cable end in the boss 61 or 63. The foregoing procedure is repeated for each of the buffer tubes using one tray for each pair of buffer tubes from the respective cables. This will result in each of the cavities of the receptacle 59 ultimately being filled with one tray. If desired further conventional strain relief members 68 (see FIG. 2) on the base 3 may be attached to the buffer tubes adjacent to the slots 55, 57.

After the trays have been installed, thus completing all the splices, the container 59 is filled with a heavier than water fluid such as liquid silicone to protect the splices from moisture. The cover 95 may then be installed on the receptacle 59. Thereafter, the receptacle 59 may be carefully placed into a hand hole or in the ground and buried.

The invention is claimed as follows:

1. A method of handling and storing spliced ends of optical fibers of first and second optical fiber cables in which the fibers in each cable are in a plurality of buffer tubes with each buffer tube encasing a plurality of optical fibers and each cable having a sheath encasing the buffer tubes, said method comprising providing for each of said first and second cable a length of buffer tube that extends beyond the end of the associated cable sheath, providing for each said buffer tube a length of each of the optical fibers in the tube that extends beyond the end of the associated buffer tube, splicing the end of each fiber with an end of a fiber projecting from the other buffer tube to form a plurality of optical fiber splices between the ends of the buffer tubes, mounting the splices on a splice block such that the splices are spaced from each other but are in juxtaposed relationship, securing said splices in place on said splice block in said spaced juxtaposed relationship, mounting said splice block with the splices thereon on a support member with the fibers being retained on the support member for disposition along predetermined paths, wrapping the buffer tubes over said support member a plurality of times to take up and store the length of buffer tube resulting from the portion of the buffer tube that projects from the end of its associated cable sheath, and retrievably storing the support member on an additional structure.

2. A method according to claim 1 in which said wrapping is effected by turning said support member to take up the lengths simultaneously in both buffer tubes.

3. A method according to claim 1 including removably storing the support member on a structure capable of storing a plurality of support members for other optical fiber-containing buffer tubes of the cables such that a plurality of support members containing wrapped on buffer tubes may be mounted on said structure in such a manner that any support member may be removed from said structure without disturbing the other support members.

4. A method according to claim 1 including mounting the ends of the first and second cables on said structure.

5. A method according to claim 1 including disposing fiber portions extending from said splices in arcuate paths.

6. A method according to claim 5 in which said arcuate paths are on opposite sides of said splice block.

7. A method according to claim 1 in which the splices are secured to the splice block by an adhesive.

8. A method according to claim 1 in which the support member is unitary in construction.

9. Apparatus for storing the spliced end sections of optical fibers from first and second cables comprising a tray having means forming first and second series of side-by-side arcuate channels each for receiving an optical fiber and for confining the fiber in a path which defines a radius greater than the shortest radius of bend which the fiber can undergo without damage due to excess flexure, the first series being spaced from the second series by a gap, a splice block releasably mounted in said gap, said splice block also having means forming a series of channels for receiving said spliced end sections, said splice block channels substantially spanning said gap whereby the respective channels in the first series are connected to the corresponding channels in the second series by the channels in the splice block, and means for accumulating and storing on said tray fibers leading from the spliced end sections to the first and second cables.

10. Apparatus according to claim 9 in which the tray has arcuate walls spaced from said channels and forming a means for supporting fibers in a fiber-encasing buffer tube.

11. Apparatus according to claim 10 including a receptacle having means for receiving and supporting a tray with a length of buffer tube and fibers wound on said tray.

12. Apparatus according to claim 10 including a receptacle having means for mounting said first and second cables, means for receiving said tray, and means for storing in said receptacle lengths of buffer tube encased fibers that run between the tray and the cable portions at said mounting means.

13. Apparatus according to claim 12 in which said storing means comprises a cavity in the container that surrounds said tray.

14. Apparatus according to claim 9 in which said tray has means for receiving a series of buffer tube encased fibers wound thereon to take up a length of the fibers and the encasing buffer tube.

15. Apparatus according to claim 9 including a receptacle having a plurality of tray mounting means for mounting a plurality of trays for individual retrieval without disturbing the other trays.

16. Apparatus according to claim 9 wherein said tray is unitary in construction.

17. Apparatus for storing the spliced end sections of optical fibers from first and second cables comprising a tray having means forming first and second series of channels each for receiving an optical fiber, the first series being spaced from the second series by a gap, a splice block releasably mounted in said gap, said splice block also having means forming a series of channels for receiving said spliced end sections, said splice block channels substantially spanning said gap whereby the respective channels in the first series are connected to the corresponding channels in the second series by the channels in the splice block, means for accumulating and storing on said tray fibers leading from the spliced end sections to the first and second cables, and a receptacle having a plurality of tray mounting means for mounting a plurality of trays for individual retrieval without distrubing the other trays.

18. Apparatus according to claim 17 wherein said tray is unitary in construction.

* * * * *